(12) United States Patent
Nonaka (10) Patent No.: US 11,550,538 B2
(45) Date of Patent: Jan. 10, 2023

(54) INFORMATION PROCESSING TERMINAL, AUDIO SYSTEM, AND INFORMATION PROCESSING METHOD FOR ASSIGNING AUDIO PROCESSING PARAMETER TO A PLURALITY OF INPUT/OUTPUT TERMINALS

(71) Applicant: Yamaha Corporation, Hamamatsu (JP)

(72) Inventor: Takeshi Nonaka, Hamamatsu (JP)

(73) Assignee: Yamaha Corporation, Hamamatsu (JP)

( * ) Notice: Subject to any disclaimer, the term of this patent is extended or adjusted under 35 U.S.C. 154(b) by 0 days.

(21) Appl. No.: 17/350,148

(22) Filed: Jun. 17, 2021

(65) Prior Publication Data

US 2021/0397408 A1 Dec. 23, 2021

(30) Foreign Application Priority Data

Jun. 19, 2020 (JP) .............................. JP2020-105934

(51) Int. Cl.
| | |
|---|---|
| *G06F 3/16* | (2006.01) |
| *G06T 11/00* | (2006.01) |
| *G06F 3/0484* | (2022.01) |
| *G06F 3/0488* | (2022.01) |

(52) U.S. Cl.
CPC ............ *G06F 3/165* (2013.01); *G06F 3/0484* (2013.01); *G06F 3/162* (2013.01); *G06T 11/00* (2013.01); *G06F 3/0488* (2013.01)

(58) Field of Classification Search
CPC ........ G06F 3/165; G06F 3/0484; G06F 3/162; G06F 3/0488; G06F 3/04847; G06F 3/1407; G06F 3/167; G06T 11/00; H04H 60/04
See application file for complete search history.

(56) References Cited

U.S. PATENT DOCUMENTS

| | | | |
|---|---|---|---|
| 2013/0115923 A1 | 5/2013 | Earl et al. | |
| 2016/0165170 A1* | 6/2016 | McRae | G08C 17/02 |
| | | | 348/734 |
| 2016/0266867 A1 | 9/2016 | Olesh et al. | |
| 2017/0364321 A1* | 12/2017 | Chavez | G06F 3/162 |
| 2018/0219638 A1* | 8/2018 | Arimoto | H04R 3/005 |

FOREIGN PATENT DOCUMENTS

| | | |
|---|---|---|
| EP | 3 261 273 A1 | 12/2017 |
| JP | 2013-192070 A | 9/2013 |

OTHER PUBLICATIONS

European Search Report issued in European Application No. 21179202.3 dated Oct. 28, 2021 (ten (10) pages).

* cited by examiner

*Primary Examiner* — Jennifer N Welch
*Assistant Examiner* — Kuang F Chen
(74) *Attorney, Agent, or Firm* — Crowell & Moring LLP (57) ABSTRACT

An information processing terminal includes a display, an identifier, an arrangement data generator, an obtainer, and a display processor. The identifier identifies a model of an I/O device that includes a plurality of input/output terminals. The arrangement data generator generates arrangement data that shows arrangement of the plurality of input/output terminals, based on an identification result of the identifier. The obtainer obtains an audio processing parameter corresponding to each of the plurality of input/output terminals. The display processor displays the audio processing parameter corresponding to each of the plurality of input/output terminals on the display, based on the arrangement data.

15 Claims, 13 Drawing Sheets

INFORMATION PROCESSING TERMINAL, AUDIO SYSTEM, AND INFORMATION PROCESSING METHOD FOR ASSIGNING AUDIO PROCESSING PARAMETER TO A PLURALITY OF INPUT/OUTPUT TERMINALS

CROSS REFERENCE TO RELATED APPLICATIONS

This Nonprovisional application claims priority under 35 U.S.C. § 119(a) on Patent Application No. 2020-105934 filed in Japan on Jun. 19, 2020, the entire contents of which are hereby incorporated by reference.

BACKGROUND

This disclosure relates to an information processing terminal, an audio system, and an information processing method.

An I/O device including a plurality of input/output terminals connects acoustic devices such as a large number of microphones. A user such as a sound engineer performs patch setting to assign each of the plurality of input/output terminals to a predetermined channel.

As the number of channels and the number of input/output terminals are increased, it is difficult for the user to grasp what type of audio processing parameter is assigned to which input/output terminal. The user, when looking at an assignment table written on paper, for example, has grasped what type of audio processing parameter has been set for which input/output terminal. However, when assignment is changed, it is necessary to revise the contents written on the paper and it is also necessary to confirm that the contents on the paper and the contents of the actual assignment are in agreement.

SUMMARY

In view of the foregoing, an example embodiment of the present disclosure is directed to provide an information processing terminal, an audio system, and an information processing method that enable a user to intuitively grasp what type of audio processing parameter is set for which input/output terminal.

An information processing terminal includes a display, an identifier that identifies a model of an I/O device that includes a plurality of input/output terminals, an arrangement data generator that generates arrangement data that shows arrangement of the plurality of input/output terminals, based on an identification result of the identifier, an obtainer that obtains an audio processing parameter corresponding to each of the plurality of input/output terminals, and a display processor that displays the audio processing parameter corresponding to each of the plurality of input/output terminals on the display, based on the arrangement data.

A user can intuitively grasp what type of audio processing parameter is set for which input/output terminal. Other objects, advantages and novel features of the present disclosure will become apparent from the following detailed description of one or more preferred embodiments when considered in conjunction with the accompanying drawings, in which:

DETAILED DESCRIPTION

Figure 1:
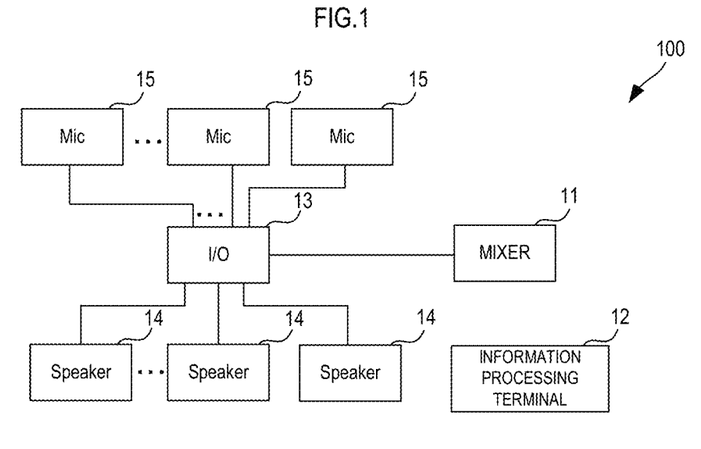
FIG. 1 is a block diagram showing a configuration of an audio system 100.

FIG. 1 is a block diagram showing a configuration of an audio system 100. The audio system 100 includes a mixer 11, an information processing terminal 12, an I/O device 13, a plurality of speakers 14, and a plurality of microphones 15.

The mixer 11 and the I/O device 13 are connected to each other through a network cable. The I/O device 13, the plurality of speakers 14, and the plurality of microphones 15 are connected to one another through an audio cable. The information processing terminal 12 is connected to the mixer 11 through wireless communication.

However, in the present disclosure, the connection between the devices is not limited to the above-stated example. For example, the mixer 11 and the information processing terminal 12 may be connected by a communication line such as a USB cable, an HDMI (registered trademark), or a MIDI. In addition, the mixer 11 and the I/O device 13 may be connected with an audio cable.

The mixer 11 is an example of an audio processing apparatus of the present disclosure. The mixer 11 receives an input of an audio signal from the I/O device 13 or outputs an audio signal to the I/O device 13. It is to be noted that the audio processing apparatus is not limited to the mixer 11. For example, a system (DAW: Digital Audio Workstation) including hardware or software for performing work such as audio recording, editing, or mixing is also an example of the audio processing apparatus.

Figure 2:
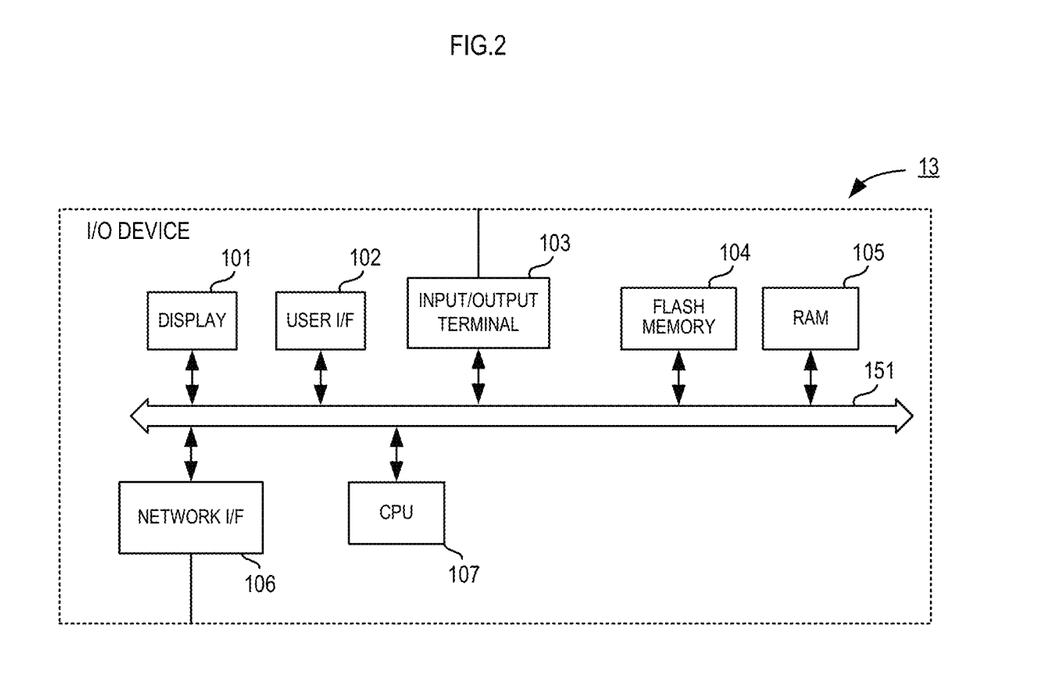
FIG. 2 is a block diagram showing a configuration of an I/O device 13.
Figure 3:
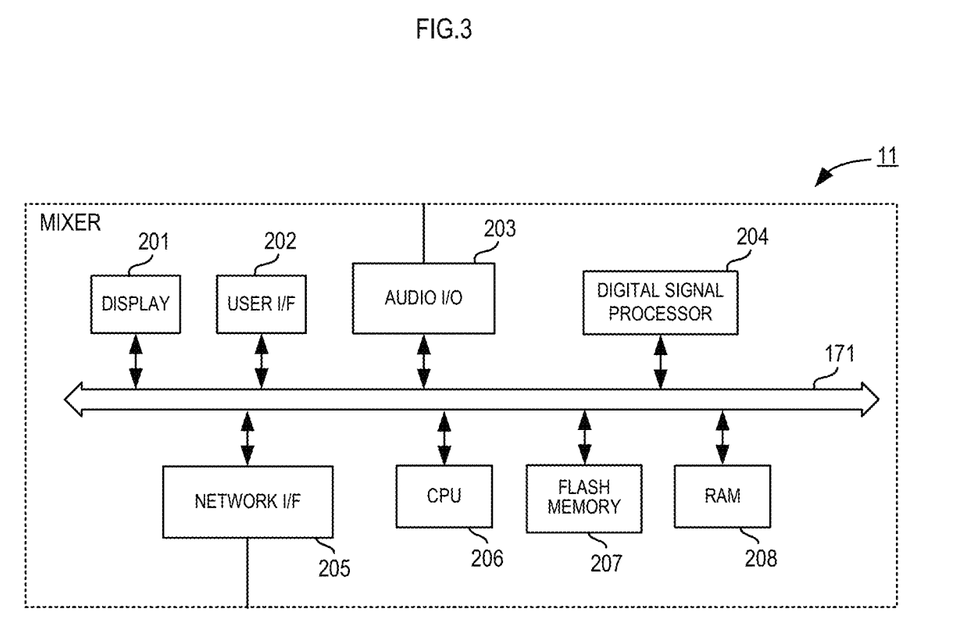
FIG. 3 is a block diagram showing a configuration of a mixer 11.
Figure 4:
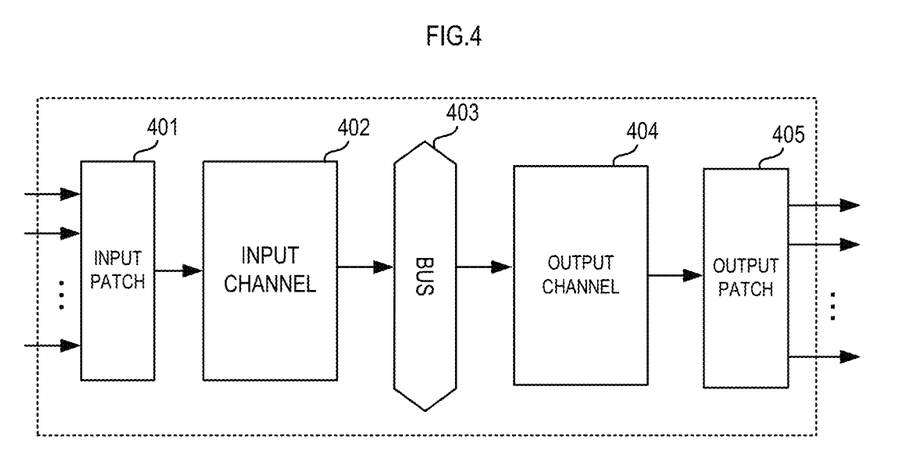
FIG. 4 is a functional block diagram of signal processing to be executed by a digital signal processor 204 and a CPU 206.
Figure 5:
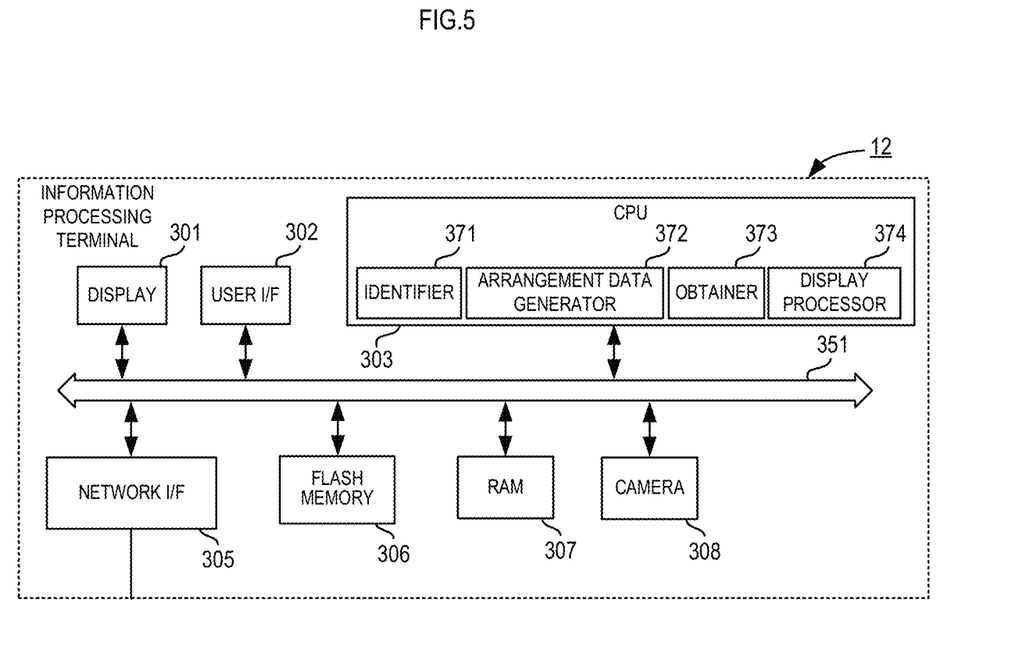
FIG. 5 is a block diagram showing a configuration of an information processing terminal 12.

FIG. 2 is a block diagram showing a configuration of the I/O device 13. FIG. 3 is a block diagram showing a configuration of the mixer 11. FIG. 4 is a block diagram functionally showing a digital signal processor. FIG. 5 is a block diagram showing a configuration of the information processing terminal 12.

The I/O device 13 includes a display 101, a user interface (I/F) 102, an input/output terminal 103, a flash memory 104, a RAM 105, a network interface (I/F) 106, and a CPU 107.

The display 101, the user interface (I/F) 102, the input/output terminal 103, the flash memory 104, the RAM 105, the network interface (I/F) 106, and the CPU 107 are connected to a bus 151.

The display 101 includes an LCD (Liquid Crystal Display) or an OLED (Organic Light-Emitting Diode), for example, and displays various types of information. The user I/F 102 includes a switch, a knob, or a touch panel, and takes an operation from a user. In a case in which the user I/F 102 is a touch panel, the user I/F 102 constitutes a GUI (Graphical User Interface, the rest is omitted) together with the display 101.

The CPU 107 reads the program stored in the flash memory 104 being a storage medium to the RAM 105 and implements a predetermined function. It is to be noted that the program that the CPU 107 reads does not need to be stored in the flash memory 104 in the own apparatus. For example, the program may be stored in a storage medium of an external apparatus such as a server. In such a case, the CPU 107 may read the program each time from the server to the RAM 105 and may execute the program.

Figure 6:
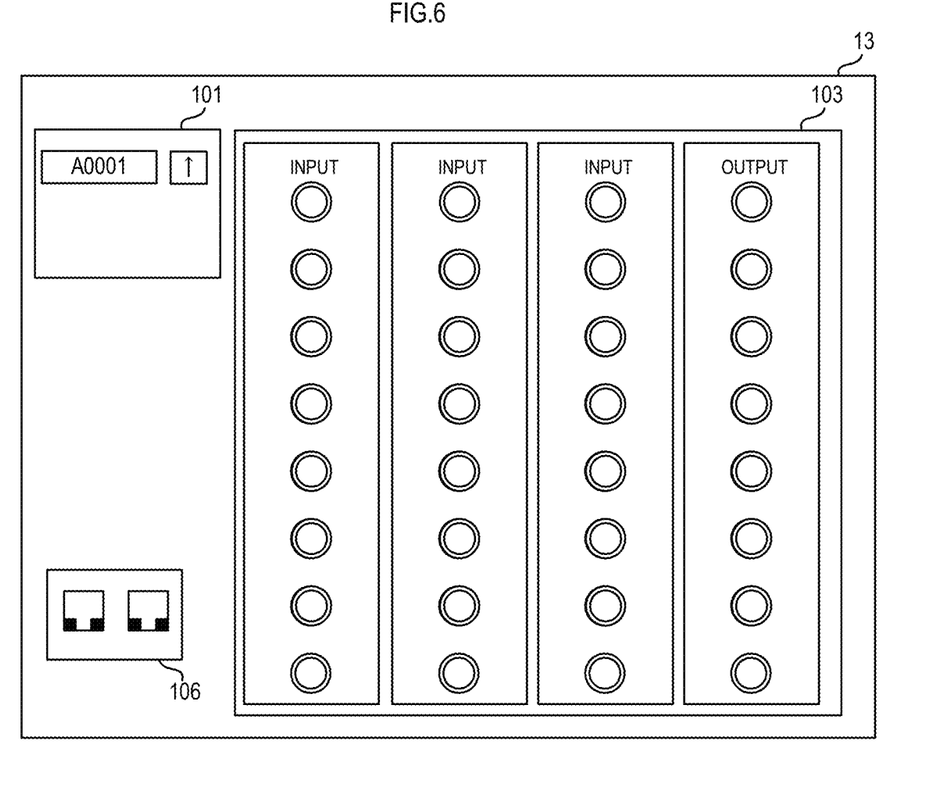
FIG. 6 shows an appearance of the I/O device 13.

FIG. 6 shows an appearance of the I/O device 13. As an example, the I/O device 13 has a housing having a rectangular parallelepiped shape. FIG. 6 is a view showing a front panel of the housing. The display 101, the input/output terminal 103, and the network I/F 106 are arranged in the front panel of the housing. It is to be noted that the user I/F 102 including a touch panel is stacked on the display 101.

The display 101 displays a model name (A0001 in the example of FIG. 6) of the I/O device 13. However, the model name does not need to be displayed on the display 101. The model name may be printed or engraved on a portion of the housing.

The input/output terminal 103 includes a plurality of input/output terminals. In the example of FIG. 6, the input/output terminal 103 includes 24 input terminals of eight rows×three columns. Each input terminal is connected to a microphone 15. Each input terminal receives an input of an audio signal from the microphone 15. In addition, the input/output terminal 103 includes eight output terminals. Each output terminal is connected to a speaker 14. Each output terminal outputs an audio signal to the speaker 14. It is to be noted that the number of terminals is not limited to this example.

The CPU 107 sends the audio signal inputted from each input terminal of the input/output terminal 103, to the mixer 11 through the network I/F 106. In addition, the CPU 107 outputs the audio signal received from the mixer 11 through the network I/F 106, to each output terminal of the input/output terminal 103.

The mixer 11 includes components such as a display 201, a user I/F 202, an audio I/O (Input/Output) 203, a digital signal processor (DSP) 204, a network I/F 205, a CPU 206, a flash memory 207, and a RAM 208. These components are connected to each other through a bus 171.

The CPU 206 is a controller that controls an operation of the mixer 11. The CPU 206 reads and implements a predetermined program stored in the flash memory 207 being a storage medium to the RAM 208 and performs various types of operations.

It is to be noted that the program that the CPU 206 reads does not also need to be stored in the flash memory 207 in the own apparatus. For example, the program may be stored in a storage medium of an external apparatus such as a server. In such a case, the CPU 206 may read the program each time from the server to the RAM 208 and may execute the program.

The digital signal processor 204 includes a DSP for performing various types of signal processing. The digital signal processor 204 performs signal processing such as mixing processing and filter processing, on an audio signal inputted from a device such as the I/O device 13, through the audio I/O 203 or the network I/F 205. The digital signal processor 204 outputs the audio signal on which the signal processing has been performed, to another device such as the I/O device 13, through the audio I/O 203 or the network I/F 205.

FIG. 4 is a functional block diagram of signal processing to be executed by the digital signal processor 204 and the CPU 206. As shown in FIG. 4, the signal processing is functionally performed through an input patch 401, an input channel 402, a bus 403, an output channel 404, and an output patch 405.

The input channel 402 has a signal processing function of 24 channels as an example. The input patch 401 assigns each input terminal of the I/O device 13 to any channel of the input channel 402.

An audio signal is supplied from the input patch 401 to each channel of the input channel 402. The each channel of the input channel 402 performs various types of signal processing on the inputted audio signal. In addition, the each channel of the input channel 402 sends out the audio signal on which the signal processing has been performed, to the bus 403 provided in the subsequent stage.

The bus 403 mixes and outputs the audio signal to be inputted. The bus 403 has a plurality of buses such as an STL (a stereo L) bus, an STR (a stereo R) bus, an AUX bus, and a MIX bus.

The output channel 404 performs signal processing on each audio signal outputted from the plurality of buses. The output patch 405 assigns each channel of the output channel 404 to each output terminal of the I/O device 13. The output patch 405 sends an audio signal to the I/O device 13 through the audio I/O 203 or the network I/F 205.

The information processing terminal 12 may be an information processing apparatus such as a personal computer, a smartphone, or a tablet PC, for example. The information processing terminal 12 includes a display 301, a user I/F 302, a CPU 303, a network I/F 305, a flash memory 306, a RAM 307, and a camera 308.

The user I/F 302 including a touch panel is stacked on the display 301, which configures a GUI. The CPU 303 reads out a program stored in the flash memory 306 being a storage medium to the RAM 307 and implements a predetermined function. It is to be noted that the program that the CPU 303 reads out does not also need to be stored in the flash memory 306 in the own apparatus. For example, the program may be stored in a storage medium of an external apparatus such as a server. In such a case, the CPU 303 may read out the program each time from the server to the RAM 307 and may execute the program.

The CPU 303 configures an identifier 371, an arrangement data generator 372, an obtainer 373, and a display processor 374 by the program.

Figure 7:
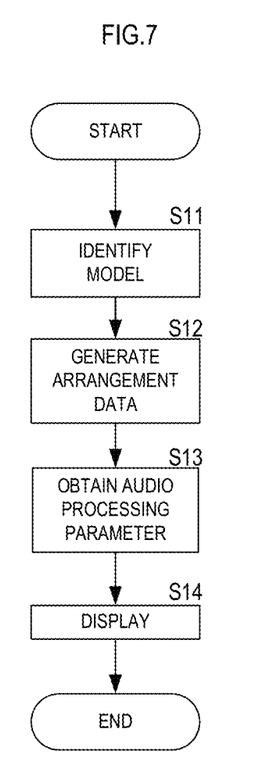
FIG. 7 is a flow chart showing an operation of a CPU 303.

FIG. 7 is a flow chart showing an operation of the CPU 303. The identifier 371 of the CPU 303 first identifies a model of the I/O device 13 (S11). Specifically, the identifier 371 extracts information on a model name from data of an image captured by the camera 308, and identifies a model, based on an extracted model name. A user captures the front panel of the housing of the I/O device 13, using the camera 308 of the information processing terminal 12. The identifier 371 extracts information corresponding to the model name by image recognition processing. In the example of FIG. 6, the model name is displayed on the display 101. Accordingly, the identifier 371 extracts the model name of "A0001." It is to be noted that the identifier 371 may identify a model by sending image data to a server and extracting a corresponding model name by the server. In addition, in a case in which the information on a model name is not displayed on the housing, the identifier 371 may identify a model by image recognition processing. In such a case, the identifier 371 determines a model most similar to the data of the image captured by the camera 308, and identifies a model.

Subsequently, the arrangement data generator 372 of the CPU 303 generates arrangement data that shows arrangement of a plurality of input/output terminals, based on the identification result of the identifier 371 (S12). The flash memory 306 previously stores the arrangement data for each model. The arrangement data generator 372 refers to the flash memory 306 using the information on the model name being the identification result, and reads out corresponding arrangement data. The arrangement data includes information on the number of input/output terminals, information that indicates a name of each input/output terminal, information that indicates a position of each input/output terminal. The position of an input/output terminal is indicated, for example, by means of an orthogonal coordinate system with reference to a predetermined position (a lower left position when the front panel is viewed straight, for example) of the I/O device 13.

In addition, the arrangement data generator 372 may download the arrangement data from a server. The server accumulates the arrangement data for each model. The arrangement data generator 372 sends the information on the model name being the identification result, to the server. The server returns the arrangement data corresponding to the information on a received model name.

On the other hand, the obtainer 373 of the CPU 303 obtains an audio processing parameter corresponding to each of the plurality of input/output terminals (S13). The audio processing parameter is a channel name, a gain, on and off of a phantom power source, a polarity, content of signal processing (filter processing, for example), on and off of a CUE, for example. The obtainer 373 obtains the audio processing parameter corresponding to each of the plurality of input/output terminals from the mixer 11. For example, the obtainer 373 obtains assignment information of the input patch 401.

Figure 8:
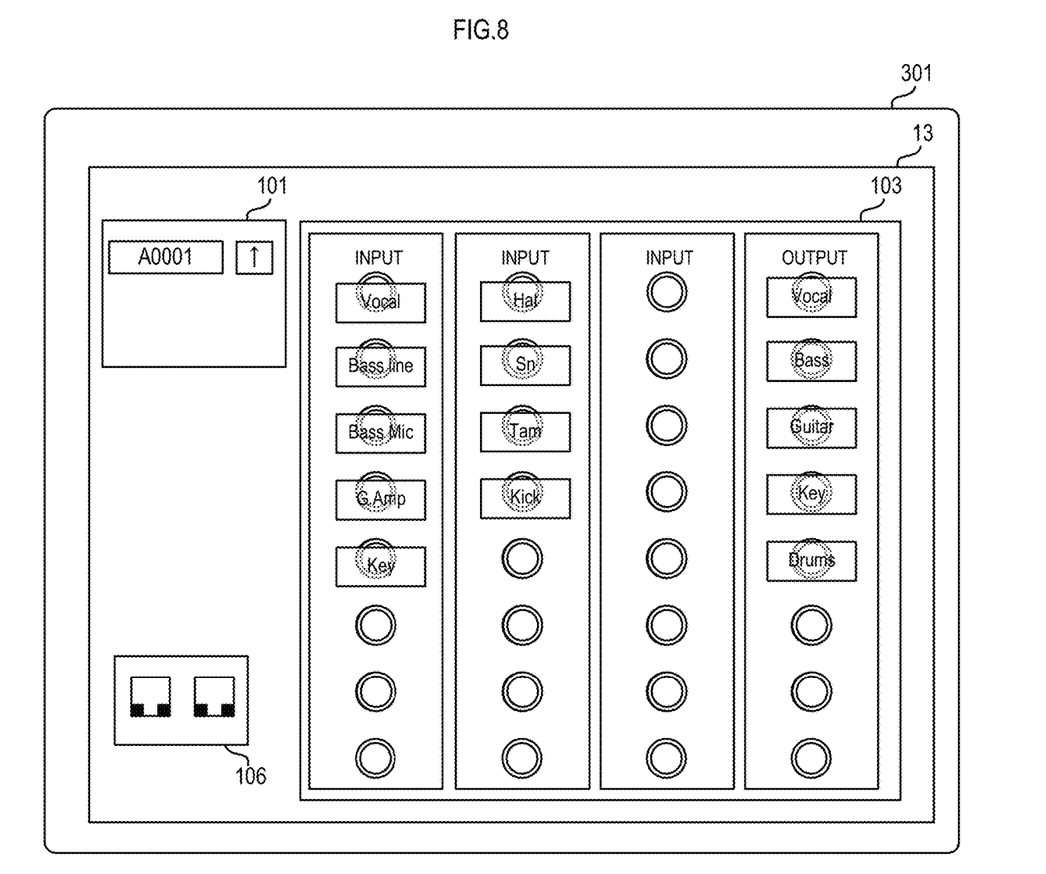
FIG. 8 shows a display example of a display 301.

The display processor 374 displays the audio processing parameter corresponding to each of the plurality of input/output terminals on the display 301, based on the arrangement data generated in S12 (S14). For example, the display processor 374, as shown in FIG. 8, displays a channel name at a position of each of the plurality of input/output terminals, the position being in the image of the front panel of the I/O device 13. The image of the front panel of the I/O device 13 may be previously stored in the flash memory 306 or may be downloaded from the server. In addition, the image of the front panel of the I/O device 13 may be an image captured by the camera 308. In a case in which the image captured by the camera 308 is used, the display processor 374 displays an audio processing parameter by superimposing the audio processing parameter on the image that is currently being captured by the camera 308.

In the example of FIG. 8, the input channel with a channel name of Vocal corresponds to a first input terminal. Therefore, the display processor 374 displays the channel name of Vocal on the first input terminal. It is to be noted that, in this example, a user previously inputs a channel name to each input channel. However, in a case in which the user has not inputted a channel name, the display processor 374 may display a channel name such as, for example, "Input Channel 1" on each input/output terminal.

As a result, the user can easily grasp what type of audio processing parameter is assigned to which input/output terminal. In addition, even in a case in which assignment is temporarily changed by the mixer 11, the display processor 374 displays changed content on the display 301. Accordingly, the user, even when changing the assignment, is able to easily grasp the content of the audio processing parameter currently assigned to each input/output terminal.

Figure 9:
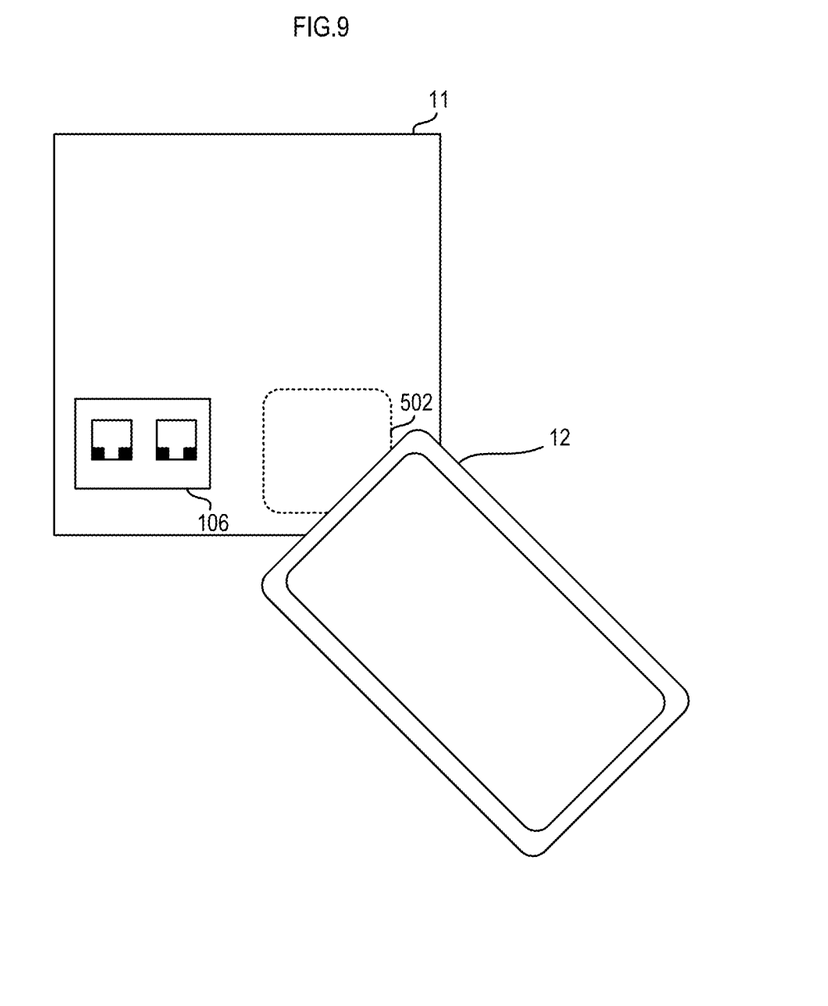
FIG. 9 shows an appearance of an I/O device 13 and an information processing terminal 12.

In the above-stated example, the identifier 371 identifies the model, based on the image of the front panel of the I/O device 13, the image having been captured by the camera 308. However, the identifier 371 may obtain model information from the I/O device 13, using a predetermined communication function, for example. FIG. 9 shows an appearance of an I/O device 13 and an information processing terminal 12 according to a first modification.

In the example of FIG. 9, NFC is used as a communication interface. An NFC I/F 502, as shown in FIG. 9, is provided in a portion of a housing of the I/O device 13, for example. The NFC I/F 502 is an example of a communication interface and performs communication with other devices through an antenna. According to the NFC standards, a communicable distance is limited to a close range such as 10 cm, for example. Therefore, the NFC is able to communicate with only a device at the close range. As a matter of course, the communication interface used for the present disclosure is not limited to the NFC. For example, the housing of the I/O device 13 may include a beacon with Bluetooth (registered trademark) Low Energy technology. The information processing terminal 12 may obtain the information on a model name using Bluetooth (registered trademark).

A user, as shown in FIG. 9, brings the information processing terminal 12 closer to the housing of the I/O device 13. In such a case, the information processing terminal 12 also includes an NFC I/F. The identifier 371 obtains the information on a model name from the I/O device 13 through the NFC. In such a manner, the identifier 371 may identify a model.

Figure 10:
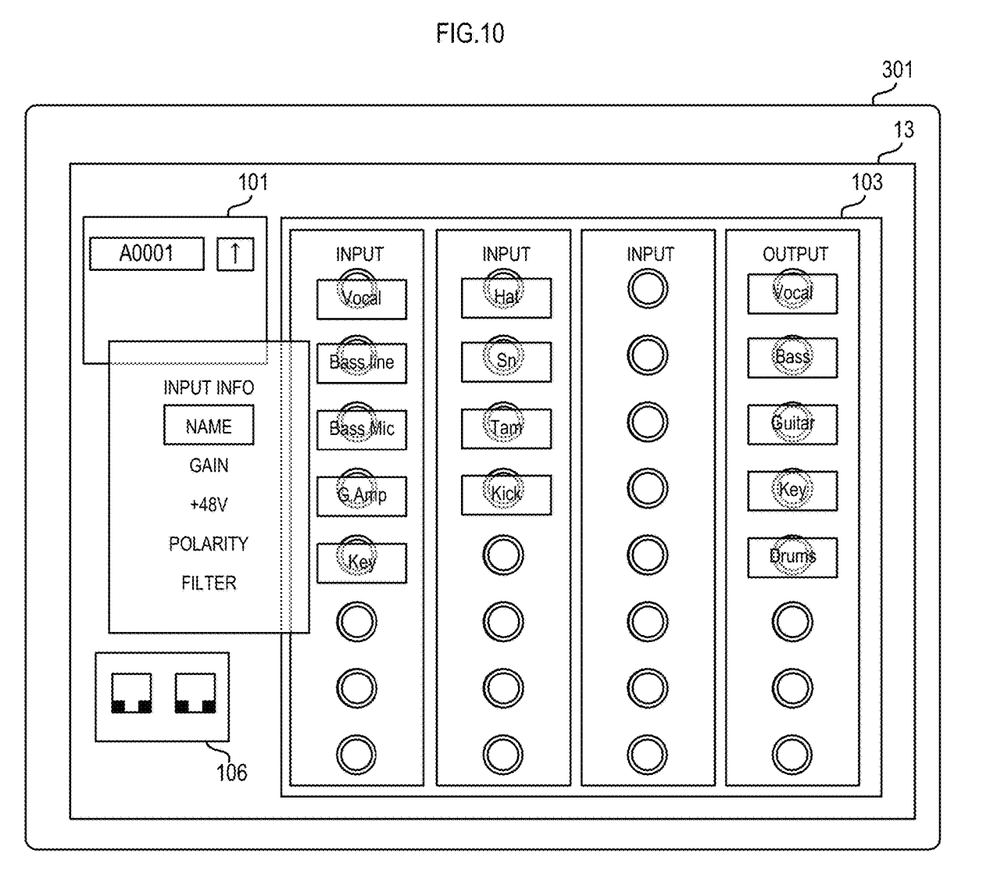
FIG. 10 shows a display example of the display 301.
Figure 11:
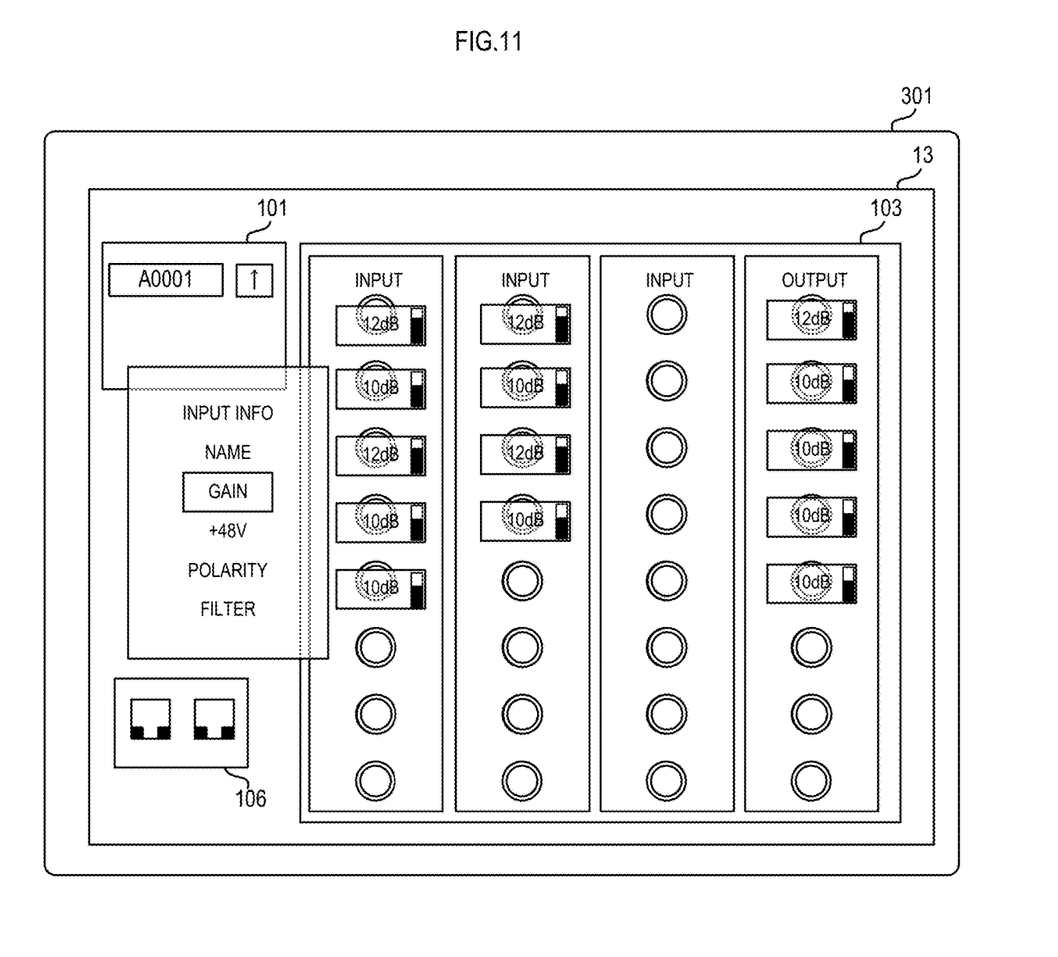
FIG. 11 shows a display example of the display 301.

FIG. 10 and FIG. 11 show a display example of the display 301 according to a second modification. The user I/F 302 including a touch panel is stacked on the display 301, which configures a GUI. The user I/F 302 takes an operation with respect to an audio processing parameter from a user through the touch panel.

For example, when the user touches the display 301, the display processor 374 displays a screen of "INPUT INFO" shown in FIG. 10 and FIG. 11. The "INPUT INFO" is a screen for an operation of switching what is displayed. In the example of FIG. 10, the "INPUT INFO" includes "NAME," "GAIN," "+48V," "POLARITY," and "FILTER." The "NAME" indicates a channel name. The "GAIN" indicates a gain. The "+48V" indicates a phantom power source. The "POLARITY" indicates a polarity. The "FILTER" indicates a filter.

Figure 12:
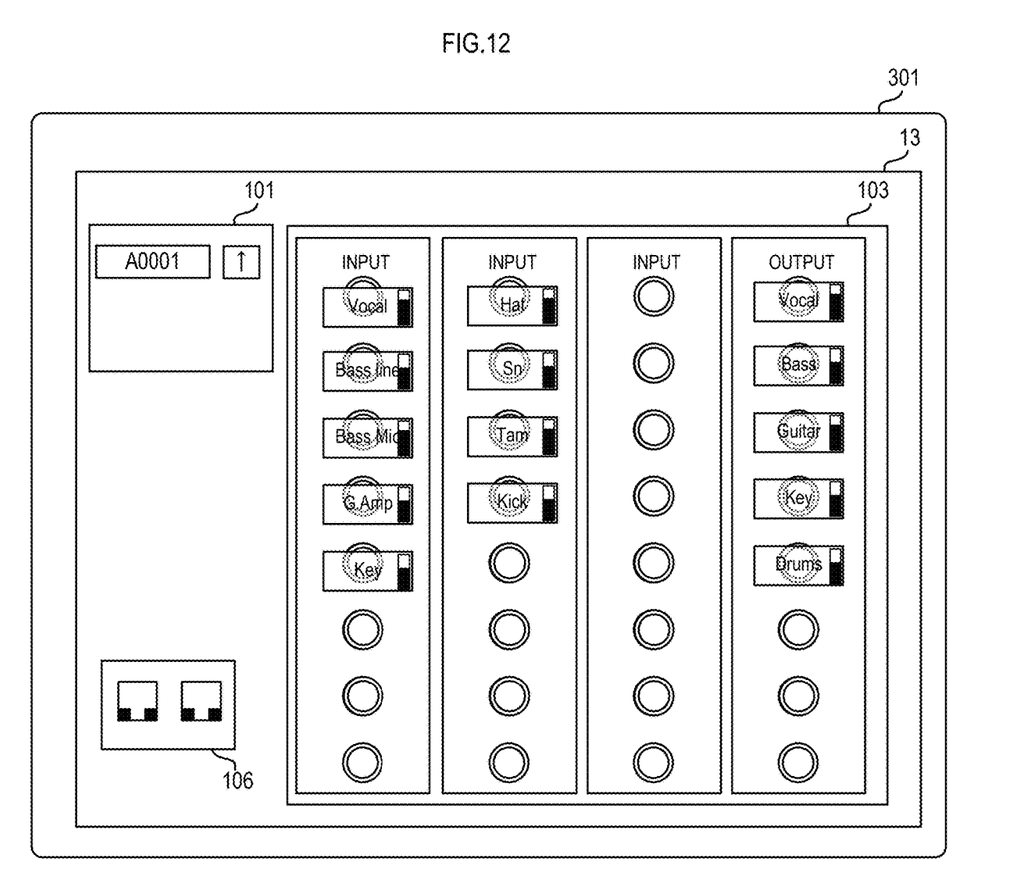
FIG. 12 shows a display example of the display 301.

Herein, the user selects the "GAIN," for example, as the operation of switching what is displayed. Then, as shown in FIG. 11, the display processor 374, as an audio processing parameter, displays a gain in place of a channel name. In the example of FIG. 11, the display processor 374 displays a numerical value and level gauge of a gain. The gain may be indicated only by the numerical value or may be indicated only by the level gauge. In addition, as shown in FIG. 12, for example, the display processor 374 may display both a channel name and a level gauge. Accordingly, the user can look over the gain of each input/output terminal.

It is to be noted that the switching of display is not limited to the above-stated example. For example, the display processor 374 may display a preview of a scene recall. The scene recall is processing of reading out scene data stored in the flash memory 207 of the mixer 11. When the user performs a scene recall, the content of the audio processing parameter changes. Displaying a preview of a scene recall is a function in which only the content of the audio processing parameter to be displayed on the display 301 changes while the audio processing parameter in the mixer 11 is maintained. When the user performs an operation of displaying a preview of a scene recall, the information processing terminal 12 receives corresponding scene data from the mixer 11. The display processor 374 displays the content of the audio processing parameter corresponding to the scene data, at a position of each input/output terminal of the display 301. Accordingly, the user can grasp how the content of the audio processing parameter changes in a case of performing the scene recall. At such a time, the content of signal processing of the mixer 11 has not changed yet, so that the user can easily grasp the content of the audio processing parameter even in a state in which sound is not able to be switched, such as an actual performance of a concert.

Figure 13:
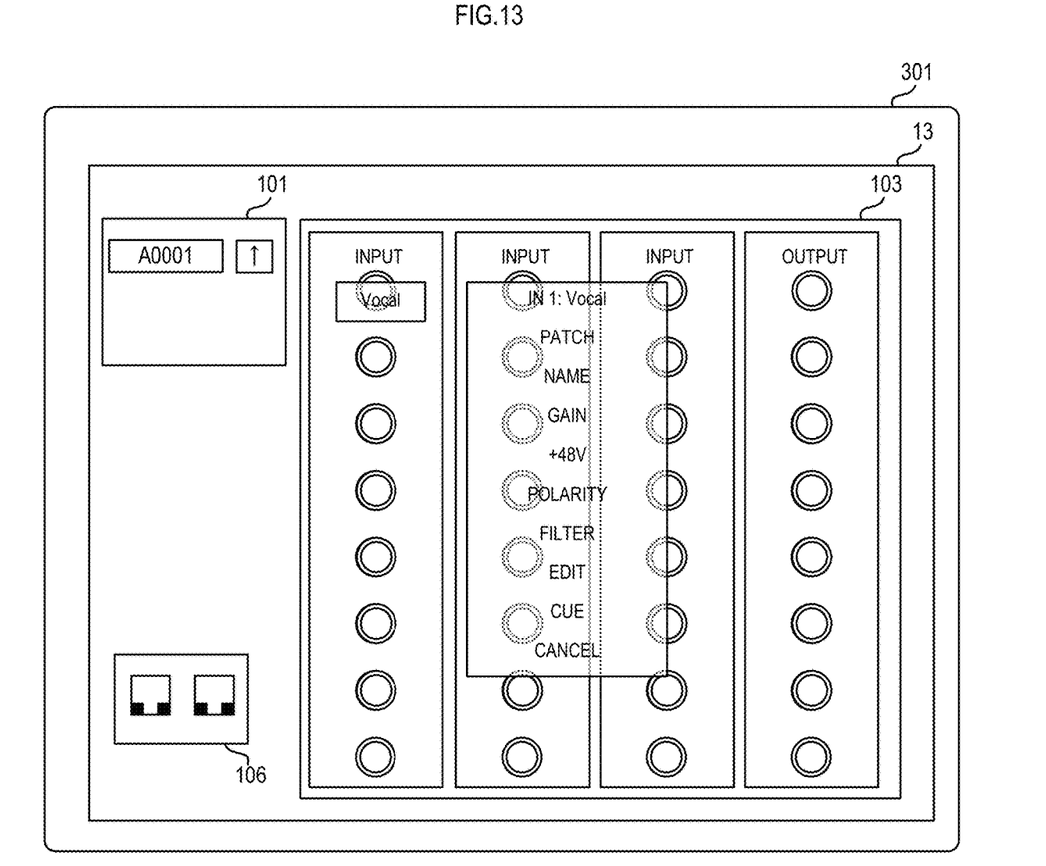
FIG. 13 shows a display example of the display 301.

FIG. 13 shows a display example of the display 301 according to a third modification. The information processing terminal 12 according to the third modification is able to set the mixer 11. For example, when a user touches a position of each input/output terminal that is currently being displayed on the display 301, the display processor 374 displays a setting screen of each input/output terminal as shown in FIG. 13.

In the example of FIG. 13, an input terminal 1 is being touched. The display processor 374 displays the setting screen "IN 1: Vocal" of the input terminal 1. The setting screen includes "PATCH," "NAME," "GAIN," "+48V," "POLARITY," "FILTER," "EDIT," "CUE," and "CANCEL."

The user, when touching the "PATCH," can change an input channel to be assigned to the input terminal 1. When the user changes the input channel to be assigned to the input terminal 1, the information processing terminal 12 sends information that indicates the input channel to be assigned, to the mixer 11. The mixer 11 changes assignment of the input patch 401, based on received information.

The user, when touching the "NAME," can change a channel name. In such a case, the assignment of the input patch 401 is not changed but only the channel name is changed.

The user, when touching the "GAIN," can change a gain. The display processor 374, when taking a touch of the "GAIN," displays a knob or a fader, for example. The information processing terminal 12, by taking an operation of the knob or the fader, takes a gain change operation. The information processing terminal 12 sends the information on changed gain, to the mixer 11. The mixer 11 changes the assignment of the input patch 401, based on received information on the gain.

The user, when touching the "+48V," can turn on and off a phantom power source. The user, when touching the "POLARITY," can reverse polarity. When the user touches the "FILTER," the screen shifts to a filter setting screen, and thus the user can turn on and off of a filter and can set filter property.

When the user touches the "EDIT," the screen shifts to a channel setting screen. The channel setting screen enables the user to set content of signal processing, a destination of an audio signal, or an amount of feed, for example.

The user, when touching the "CUE," can turn on and off a CUE. When the CUE is turned on, an audio signal corresponding a channel is sent out to monitor headphones of a user.

When the user touches the "CANCEL," the setting screen closes.

Although FIG. 13 shows an example in which the content of the audio processing parameter of the input terminal and the input channel is changed, the content of an audio processing parameter of the mixer 11 is able to be similarly changed at the output terminal and the output channel.

In the above-stated example, the identifier 371 extracts information on a model name from data of an image captured by the camera 308, and identifies a model, based on an extracted model name. However, the identifier 371 may identify the model, based on, for example, a unit ID of a user, unique information (a manufacturing number) for each device, or the like, in place of a model name. It is to be noted that, the unit ID is a management number (an alphanumeric character, for example) that is uniquely assigned, within the audio system 100, to each of a plurality of devices that configure the audio system 100. The unit ID may be manually assigned to each device by a user using a device (the mixer 11, for example) used as a master, or may be automatically assigned by the device used as a master. As a result, the identifier 371 is able to identify each I/O device even when a plurality of I/O devices of the same model are used.

The description of the present embodiments is illustrative in all points and should not be construed to limit the present disclosure. The scope of the present disclosure is defined not by the foregoing embodiments but by the scope of claims of patent. Further, the scope of the present disclosure is intended to include all modifications within the scopes of the claims of patent and within the meanings and scopes of equivalents.

For example, an operation taker may take an operation of a user by speech recognition processing. In addition, the information processing terminal may be a head-mounted information processing terminal. In such a case, the operation taker of the information processing terminal recognizes a gesture of a user, and takes an operation corresponding to the gesture of a user.

What is claimed is:

1. An information processing terminal comprising:
a display;
a processor that executes instructions to:
identify a model of an I/O device that includes a plurality of input/output terminals based on data of an image obtained by capturing the I/O device;
generate arrangement data that shows positional arrangement of the plurality of input/output terminals, based on an identification result of the identifier;
obtain an audio processing parameter corresponding to each of the plurality of input/output terminals;
display the audio processing parameter by superimposing the audio processing parameter on data of a captured image of a panel of the I/O device, the panel including the plurality of input/output terminals; and
display the audio processing parameter corresponding to each of the plurality of input/output terminals in the captured image of the panel displayed on the display, based on the arrangement data.

2. The information processing terminal according to claim 1, wherein the processor that receives an operation of a user, and wherein the operation of a user includes an operation with respect to the audio processing parameter.

3. The information processing terminal according to claim 2, wherein the operation of a user includes an operation of switching what is displayed.

4. The information processing terminal according to claim 2, wherein the operation of a user includes a display operation of displaying a setting screen of the plurality of input/output terminals.

5. The information processing terminal according to claim 2, wherein the operation of a user includes an on/off operation of a CUE.

6. The information processing terminal according to claim 2, wherein the operation of a user includes a preview operation of displaying a preview of a scene recall.

7. The information processing terminal according to claim 1, wherein the audio processing parameter includes a channel name.

8. An audio system comprising:
an I/O device;
an information processing terminal; and
an audio processing apparatus, wherein
the I/O device includes a plurality of input/output terminals that take an audio signal and send and receive the audio signal to the audio processing apparatus;
the audio processing apparatus includes a digital signal processor that processes the audio signal, based on an audio processing parameter corresponding to each of the plurality of input/output terminals; and
the information processing terminal includes
a display,
a processor that executes instructions to:
identify a model of the I/O device based on data of an image obtained by capturing the I/O device,
generate arrangement data that shows positional arrangement of the plurality of input/output terminals, based on an identification result of the identifier,
obtain the audio processing parameter corresponding to each of the plurality of input/output terminals;
display the audio processing parameter by superimposing the audio processing parameter on data of a captured image of a panel of the I/O device, the panel including the plurality of input/output terminals; and
display the audio processing parameter corresponding to each of the plurality of input/output terminals in the captured image of the panel displayed on the display, based on the arrangement data.

9. An information processing method comprising:
identifying a model of an I/O device that includes a plurality of input/output terminals based on data of an image obtained by capturing the I/O device;
generating arrangement data that shows a positional arrangement of the plurality of input/output terminals, based on an identification result;
obtaining an audio processing parameter corresponding to each of the plurality of input/output terminals;
displaying the audio processing parameter by superimposing the audio processing parameter on the data of a captured image of a panel of the I/O device, the panel including the plurality of input/output terminals; and
displaying the audio processing parameter corresponding to each of the plurality of input/output terminals in the captured image of the panel displayed on a display, based on the arrangement data.

10. The information processing method according to claim 9, further comprising: taking an operation of a user, wherein the operation of a user includes an operation with respect to the audio processing parameter.

11. The information processing method according to claim 10, wherein the operation of a user includes an operation of switching what is displayed.

12. The information processing method according to claim 10, wherein the operation of a user includes a display operation of displaying a setting screen of the plurality of input/output terminals.

13. The information processing method according to claim 10, wherein the operation of a user includes an on/off operation of a CUE.

14. The information processing method according to claim 10, wherein the operation of a user includes a preview operation of displaying a preview of a scene recall.

15. The information processing method according to claim 9, wherein the audio processing parameter includes a channel name.

* * * * *